Sept. 16, 1952   K. O. SIEMON   2,611,044
BIN LEVEL CONTROLLER
Filed July 22, 1949

INVENTOR.
Karl O. Siemon

Patented Sept. 16, 1952

2,611,044

UNITED STATES PATENT OFFICE 2,611,044

BIN LEVEL CONTROLLER

Karl O. Siemon, Westfield, N. J.

Application July 22, 1949, Serial No. 106,137

3 Claims. (Cl. 200—52)

This invention relates to a switching device for indicating and controlling the level or height of granular or liquid material in a bin or other container.

An object of my invention is to provide an improved device of the above mentioned type which may be attached to or installed in a bin in a plurality of positions.

Another object of my invention is to provide a switching device in which a probe is flexibly mounted with one end protruding into the bin and the other end arranged to actuate a switch.

Another object is to afford means for adjusting the sensitivity of the switch actuating mechanism.

These and other objects of the invention, as will appear hereinafter, are described in the following specification and shown in the accompanying drawings in which—

Similar numerals refer to similar parts throughout the several views.

Figure 1:
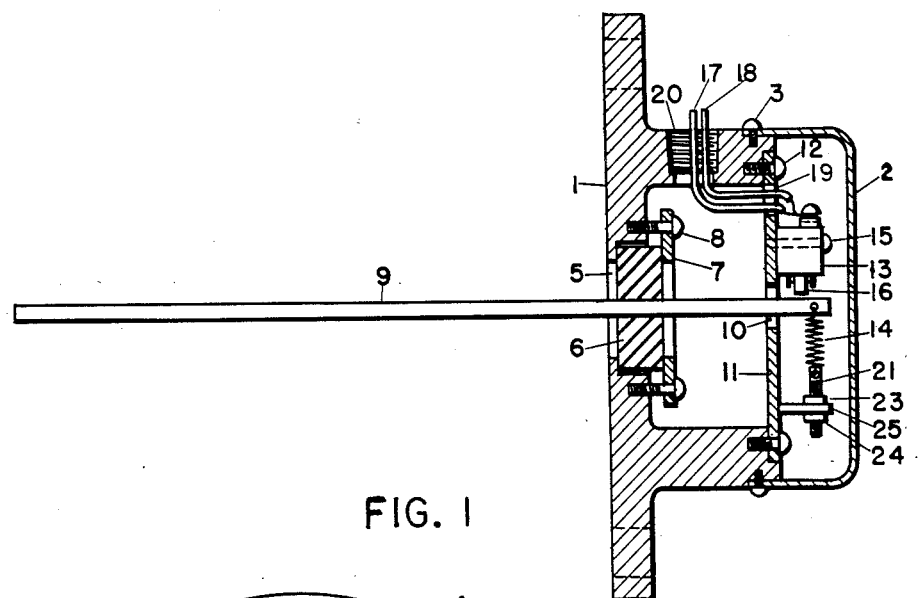
Figure 1 is a vertical section through the device.

The main frame 1 and removable cover 2, which is attached to the main frame 1 by means of screws 3, comprise the housing. The main frame 1 is provided with bolt holes 4 in the flanged section for bolting it against the side of a bin or mounting it in any other desired operating position. Concentrically with a round opening 5 through the middle of the flanged section of frame 1, a flexible disk 6 is secured by means of a washer 7 and screws 8. Disk 6 is made of rubber or other suitable flexible material and carries probe 9 firmly in a centrally located bore so as to permit probe 9 to deflect laterally when subjected to a lateral force. Probe 9 is so disposed in disk 6 that the protruding ends are preferably of unequal length, the longer end projecting into the bin and the shorter end extending into the housing of the device through an oblong opening 10 in the carrier plate 11. The oblong opening 10 is so arranged that it will guide and limit the movement of probe 9, thus preventing any damage to the limit switch 13.

Carrier plate 11 is fastened to the hub section of main frame 1 by means of screws 12 and supports limit switch 13 and spring 14. The limit switch 13 is fastened to carrier plate 11 by screws 15 and so disposed relative to probe 9 that a lateral motion of the short end of the probe 9, caused by pressure of the material in the bin on the exposed long end of the probe 9, will actuate the limit switch 13 by means of leaf actuator 16. Conductors 17 and 18 are attached to the terminals of the limit switch 13 and brought to the outside of the switch housing through a round opening 19 in the carrier plate 11 and a threaded opening 20 in the hub of the main frame 1, which is adapted to receive conduits or boxhole connectors. Outside of the switch housing, conductors 17 and 18 are connected to a source of electric current and a signal light or a control switch of an electric motor driving equipment which charges material into the bin or removes material from the bin.

Spring 14 is provided to adjust the sensitivity of the switching action and to hold probe 9 distant from the leaf actuator 16 of the limit switch 13 as long as the exposed end of the probe is free of material. The spring 14 is fastened at one end to the probe 9 and at the other end to the adjusting screw 21 which is secured in position by means of support bracket 25 and lock nuts 23 and 24. Support bracket 25 is attached to carrier plate 11. The tension of spring 14 can be adjusted by changing the position of lock nuts 23 and 24 on adjusting screw 21.

Figure 3:
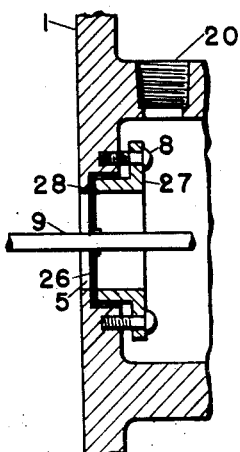
Figure 3 is a partial vertical section through a device employing a metal disk.

In Figure 3 the probe 9 is secured in a thin flexible metal disk 26, which is mounted on the main frame 1 by means of a gland 27 and screws 8. Gasket 28 seals the contact surface of the metal disk 26 and frame 1. Other parts of the switching device, which have been omitted in Figure 3, are similar to the corresponding parts shown in Figure 1.

While normally it will be advantageous to use a probe of round cross-section, the exposed end of the probe may be provided with a horizontal vane or flat surface to offer greater resistance to the flow of the material. The probe may also be equipped with a float at the exposed end when the material in the bin or container is a liquid.

The operation of the mechanism thus far described will be apparent. For proper functioning the switching device is attached through the main frame 1 to the wall of a bin or container at a predetermined level with the probe 9 projecting into the bin through a circular hole in the wall of the bin. The entire unit may also be suspended or otherwise supported inside such a bin or container. The tension of the spring 14 is so adjusted that it will hold the probe 9 distant from the leaf actuator 16, as long as the material in the bin does not contact the exposed end of the probe 9. When the level of the material in the bin rises to the level at which the switching device is installed, the force of the flowing material deflects the exposed end of the probe 9 and thereby causes the opposite end of the probe to depress the leaf actuator 10 and thus actuate the limit switch 13.

If the limit switch 13 is connected by wiring to a signal light, the turning-on of the light will indicate that the bin has been filled up to the level at which the switching device is located. If the limit switch 13 is connected to the control switch of an electric motor driving equipment which feeds material into the bin, the motor can be stopped when the level of the switching device is reached.

When the material recedes from the control level, the pressure on the probe 9 is relieved and the probe is returned to the original position by the spring 14 thus releasing the limit switch 13 and reversing the switch action.

Figure 2:
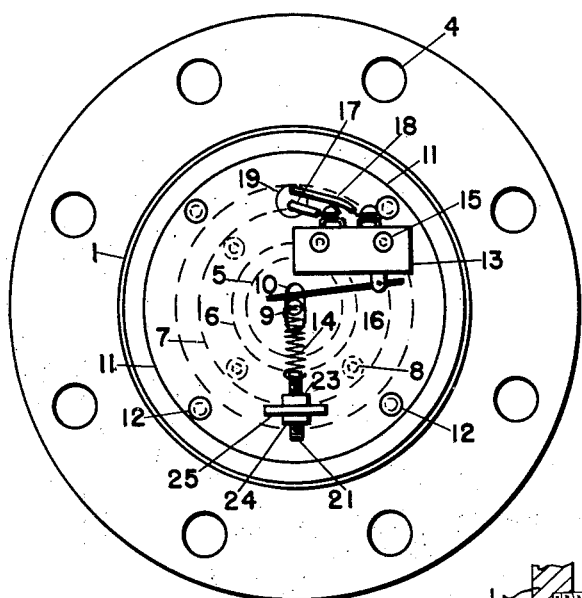
Figure 2 is a rear elevational view of the device with the rear cover removed.

If the parts are in the position illustrated in Figs. 1 and 2 of the drawings, it will be seen that the flanged section of the main frame 1 and the flexible disk 6 are substantially vertical or upright and the probe 9 horizontal. This is one conventional operating position. The switching device will operate satisfactorily also if it is attached to an inclined wall of a bin or a chute or other container.

Further the switching device may be mounted preferably with the probe in a vertical position, on the frame of a travelling conveyor, which oscillates horizontally on top of a bin and charges material into it. When the material in the bin reaches a level where it touches the extreme end of probe 9, it will deflect the probe and thereby actuate the limit switch 13 which in turn will cause the motor of the conveyor to be shut off.

Figure 4:
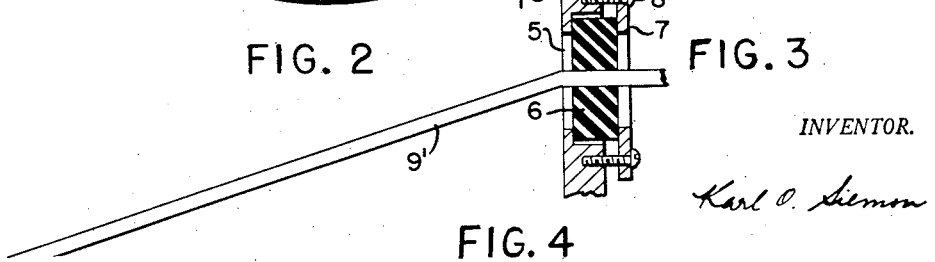
Figure 4 shows a modified structural detail of the vertical section as represented in Figure 1.

It is important for the proper functioning of the device that the angle between the general direction of flow of the material in the bin and the longitudinal axis of the probe be sufficiently large so that the probe will be laterally deflected. In installations where this angle is too small, the exposed end of probe 9 is bent, as indicated by the probe 9' in Fig. 4, so that the angle between the direction of flow and the axis of the bent extreme portion of the probe is increased.

This invention is not to be understood as restricted to the details set forth, since these may be modified within the scope of the appended claims without departing from the spirit and scope of the invention.

I am aware that prior to my invention switching devices have been made wherein a rod was mounted in a rubber ball. However, I believe that the use of a disk for supporting the probe provides a distinct improvement in switching devices, because it affords a larger variation in the proportions and flexibility of the supporting member and thereby in the sensitivity of the device. It permits a larger variety in the selection of materials of construction, thus increasing the applicability of the device; it offers less obstruction to the flow of material, and reduces the hazard of breaching of the material.

Having thus described the invention, what I claim as new and desire to secure by Letters Patent is:

1. A level control mechanism for dry granular material, including a frame, a disk of rubber-like resilient material mounted concentrically over and covering a circular opening in said frame, a rod mounted in a central bore through said disk and protruding on opposite sides of the disk, one end of said rod protruding through said circular opening in said frame, a carrier plate supported on said frame, a switch mounted on said carrier plate and operable by deflection of said rod, a spring supported on said carrier plate and secured on said rod so as to restrain the deflection of the rod, and means of adjusting the force of said spring.

2. A device for controlling the volume of dry granular material in a storage space comprising, in combination, a non-buckling solid disk of rubber-like resilient substance secured to an apertured plate, a probing rod pivotally supported by and secured to said disk, one end of said rod protruding through the aperture in said plate, a switch adapted to be operated by lateral movement of the opposite end of said rod; conjoined with means for adjusting and balancing and restraining any switch-actuating movement of the said probe until the same is subjected to countervailing lateral contact with the granular material being gauged, said means comprising an adjustable tension spring attached to the short switch-actuating end of the probing arm.

3. The same as claim 2, but further characterized by a pivotally supported probing rod which is bent to an obtuse angle adjusted in direction to the predetermined position where effective operating contact is to be made with the advancing material being gauged.

KARL O. SIEMON.

REFERENCES CITED

The following references are of record in the file of this patent:

UNITED STATES PATENTS

| Number | Name | Date |
|---|---|---|
| Re. 20,380 | Hickstein et al. | May 25, 1937 |
| 659,855 | Meloon | Oct. 16, 1900 |
| 2,001,168 | Turner | May 14, 1935 |
| 2,119,783 | Harrington | June 7, 1938 |
| 2,237,341 | Dungler | Apr. 8, 1941 |
| 2,258,334 | Miller | Oct. 7, 1941 |
| 2,260,636 | Neff | Oct. 28, 1941 |
| 2,428,246 | Scifres | Sept. 30, 1947 |